(12) United States Patent
Kashyap V et al.

(10) Patent No.: US 9,021,569 B1
(45) Date of Patent: Apr. 28, 2015

(54) WIRELESS GUEST ACCESS

(71) Applicant: Avaya Inc., Basking Ridge, NJ (US)

(72) Inventors: Tejas Kashyap V, Bangalore (IN);
Vivek L Atreya, Bangalore (IN); Shashi Ankaiah, Bangalore (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/160,527

(22) Filed: Jan. 21, 2014

(51) Int. Cl.
*H04L 29/06* (2006.01)
*G06F 21/35* (2013.01)

(52) U.S. Cl.
CPC ...................................... *G06F 21/35* (2013.01)

(58) Field of Classification Search
CPC .. G06Q 10/107; G06F 17/30578; G06F 3/017
USPC ................. 726/7; 709/201, 203, 206; 705/7.1
See application file for complete search history.

(56) References Cited

U.S. PATENT DOCUMENTS

| | | | | |
|---|---|---|---|---|
| 6,463,463 | B1 * | 10/2002 | Godfrey et al. ............... | 709/206 |
| 7,139,722 | B2 * | 11/2006 | Perrella et al. ............... | 705/7.19 |
| 8,375,421 | B1 * | 2/2013 | Shigapov et al. .................. | 726/4 |
| 2003/0163515 | A1 * | 8/2003 | Loveland et al. ............. | 709/203 |
| 2004/0192299 | A1 * | 9/2004 | Wilson et al. ................. | 455/433 |
| 2005/0071213 | A1 * | 3/2005 | Kumhyr et al. .................... | 705/8 |
| 2006/0218224 | A1 * | 9/2006 | Agrawal et al. ............... | 709/201 |
| 2008/0098313 | A1 * | 4/2008 | Pollack .......................... | 715/753 |
| 2008/0270211 | A1 * | 10/2008 | Vander Veen et al. ............. | 705/8 |
| 2010/0269049 | A1 * | 10/2010 | Fearon .......................... | 715/744 |
| 2011/0212717 | A1 * | 9/2011 | Rhoads et al. ................ | 455/420 |
| 2014/0080428 | A1 * | 3/2014 | Rhoads et al. .................. | 455/88 |
| 2014/0108506 | A1 * | 4/2014 | Borzycki et al. .............. | 709/203 |
| 2014/0324649 | A1 * | 10/2014 | Marshall et al. ................ | 705/32 |

\* cited by examiner

*Primary Examiner* — Haresh N Patel

(57) ABSTRACT

Methods, systems and computer readable media for providing and managing wireless guest access are described. In some implementations, the method can include a method comprising mining event details including a list of one or more guest attendees for which wireless guest access is selected and a corresponding email address for each of the one or more guest attendees from an event request. The method can also include generating wireless guest access credentials for each of the one or more guest attendees that accept the request, and transmitting corresponding wireless guest access credentials to each guest attendee via email using the corresponding email address. The method can further include receiving an indication that one or more of the guest attendees has connected to a wireless network, and causing a guest access page to be displayed for each guest attendee connecting to the network. The method can also include providing an interface for entering the wireless guest access credentials via the guest access page, and validating the guest access credentials. The method can also include, when the guest access credentials are valid, permitting the guest attendee associated with those credentials to access the wireless network.

15 Claims, 4 Drawing Sheets

WIRELESS GUEST ACCESS

TECHNICAL FIELD

Embodiments relate generally to computer networks, and more particularly, to methods, systems and computer readable media for providing and managing wireless guest access.

BACKGROUND

Wireless guest access can include granting a guest user access to a company's wireless network. Typically, providing guest access can be accomplished using an administrator method or a self-registration method. In the administrator method, an internal request is raised to a network administrator, who then manually creates guest access credentials. The administrator method can be costly and time consuming.

In a self-registration system, guest users can register themselves for guest access to the wireless network. Self-registration systems may suffer from a lack of security.

Embodiments were conceived in light of the above mentioned needs, problems and/or limitations, among other things.

SUMMARY

One or more embodiments can include methods, systems and computer readable media for providing and managing wireless guest access. In some implementations, the method can include a method comprising receiving an event request including a list of one or more guest attendees for which wireless guest access is selected and a corresponding email address for each of the one or more guest attendees. The method can also include generating wireless guest access credentials for each of the one or more guest attendees, and transmitting corresponding wireless guest access credentials to each guest attendee via email using the corresponding email address. The method can further include receiving an indication that one or more of the guest attendees has connected to a wireless network, and causing a guest access page to be displayed for each guest attendee connecting to the network. The method can also include receiving guest access credentials via the guest access page, and validating the guest access credentials. The method can also include, when the guest access credentials are valid, permitting the guest attendee associated with those credentials to access the wireless network.

The event request interface can include an element for receiving an indication of which guest attendees are to be granted guest access to the wireless network. The method can further include mining attendee email addresses and event details from the meeting request. The method can also include granting the wireless guest access only for a duration of the event determined from the event request.

The method can further include granting the wireless guest access only for a location of the event determined from the event request.

Some implementations can include a system comprising one or more processors configured to perform operations. The operations can include receiving an event request including a list of one or more guest attendees for which wireless guest access is selected and a corresponding email address for each of the one or more guest attendees. The operations can also include generating wireless guest access credentials for each of the one or more guest attendees, and transmitting corresponding wireless guest access credentials to each guest attendee via email using the corresponding email address. The operations can further include receiving an indication that one or more of the guest attendees has connected to a wireless network, and causing a guest access page to be displayed for each guest attendee connecting to the network. The operations can also include receiving guest access credentials via the guest access page, and validating the guest access credentials. The operations can further include, when the guest access credentials are valid, permitting the guest attendee associated with those credentials to access the wireless network.

The event request interface can include an element for receiving an indication of which guest attendees are to be granted guest access to the wireless network. The operations can further comprise mining attendee email addresses and event details from the meeting request. The operations can further comprise granting the wireless guest access only for a duration of the event determined from the event request.

The operations can also include granting the wireless guest access only for a location of the event determined from the event request.

Some implementations can include a nontransitory computer readable medium having stored thereon software instructions that, when executed by a processor, cause the processor to perform operations. The operations can include receiving an event request including a list of one or more guest attendees for which wireless guest access is selected and a corresponding email address for each of the one or more guest attendees. The operations can also include generating wireless guest access credentials for each of the one or more guest attendees, and transmitting corresponding wireless guest access credentials to each guest attendee via email using the corresponding email address. The operations can further include receiving an indication that one or more of the guest attendees has connected to a wireless network, and causing a guest access page to be displayed for each guest attendee connecting to the network. The operations can also include receiving guest access credentials via the guest access page, and validating the guest access credentials. The operations can further include, when the guest access credentials are valid, permitting the guest attendee associated with those credentials to access the wireless network.

The event request interface can include an element for receiving an indication of which guest attendees are to be granted guest access to the wireless network. The operations can further comprise mining attendee email addresses and event details from the meeting request. The operations can further comprise granting the wireless guest access only for a duration of the event determined from the event request.

The operations can also include granting the wireless guest access only for a location of the event determined from the event request.

DETAILED DESCRIPTION

In general, some implementations can include an integration of WLAN guest access with an e-mail client (e.g., Microsoft Outlook). A user can be prompted to grant wireless guest access to non-corporate employees present in the attendee's list of a meeting request. An automated e-mail with the guest access credentials can be generated and sent to the guest for whom wireless access was requested in the meeting request and which have accepted the meeting request. Information such as attendees' e-mail addresses, date and time of the meeting, duration of the meeting and location of the meeting can be mined from the meeting request directly.

The wireless access can be granted only for the specified time duration that will be retrieved from the meeting request. Wireless access can be given for a particular location where the meeting is being organized. The meeting location (e.g., conference room) details obtained from the email client and the AP location details present on the wireless controller can be correlated. Once the Guest User connects to the Guest SSID, the guest can be prompted for the credentials on the guest access page (e.g., captive portal). The guest can enter the credentials received and gain wireless access after getting authenticated on the guest access management application (e.g., an Avaya Identity Engine).

Figure 1:
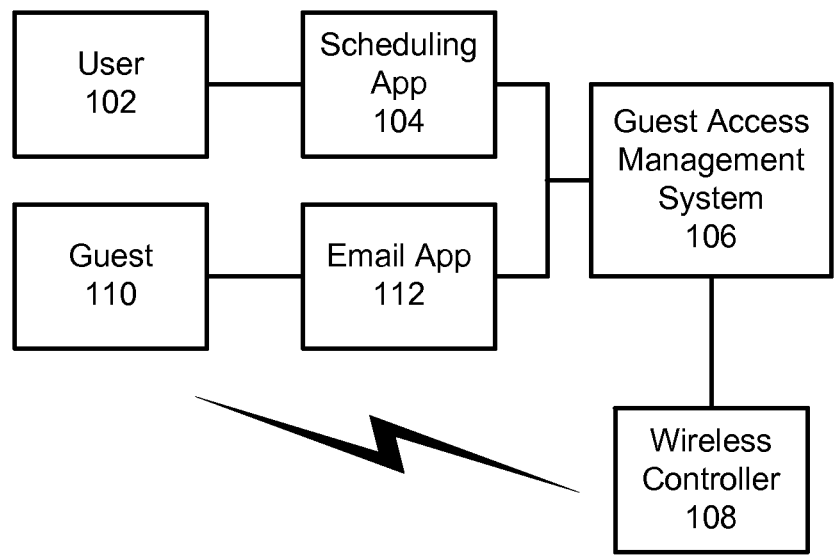
FIG. 1 is a diagram of an example system for providing and managing wireless guest access in accordance with at least one implementation.

As shown in FIG. 1, an example system 100 includes a user system 102 (e.g., a user of a corporate or enterprise network), a scheduling application 104 (e.g., a calendar application), a guest access management system 106, one or more wireless controllers 108, a guest system 110 and an email application 112.

In operation, a user creates a meeting (or other event) invitation using the scheduling application 104 (e.g., using a user interface similar to that shown in FIG. 3) via user system 102. The invitation can include a list of attendees, one or more of which may be guests (e.g., users not having existing access credentials to the network). The invitation can also include event details such as location, start date and time, duration and the like.

When creating the invitation, the user can select to provide guest wireless access to one or more of the guest attendees. When the invitation includes a selection for guest access, the invitation information can be provided to the guest access management system 106.

The guest access management system 106 can generate guest access credentials for each guest attendee and email the credentials to each corresponding guest 110 attendee via the email application 112.

Once a guest attendee is at the appointed meeting location, the guest system can be authenticated via communications with the wireless controller 108 associated with meeting location. Once authenticated, the guest system 110 can utilize the wireless network resources via the wireless controller 108. At the conclusion of the meeting duration, the guest wireless access can be terminated and the wireless controller 108 can be informed of the ending of guest access by the guest access management system 106.

Figure 2:
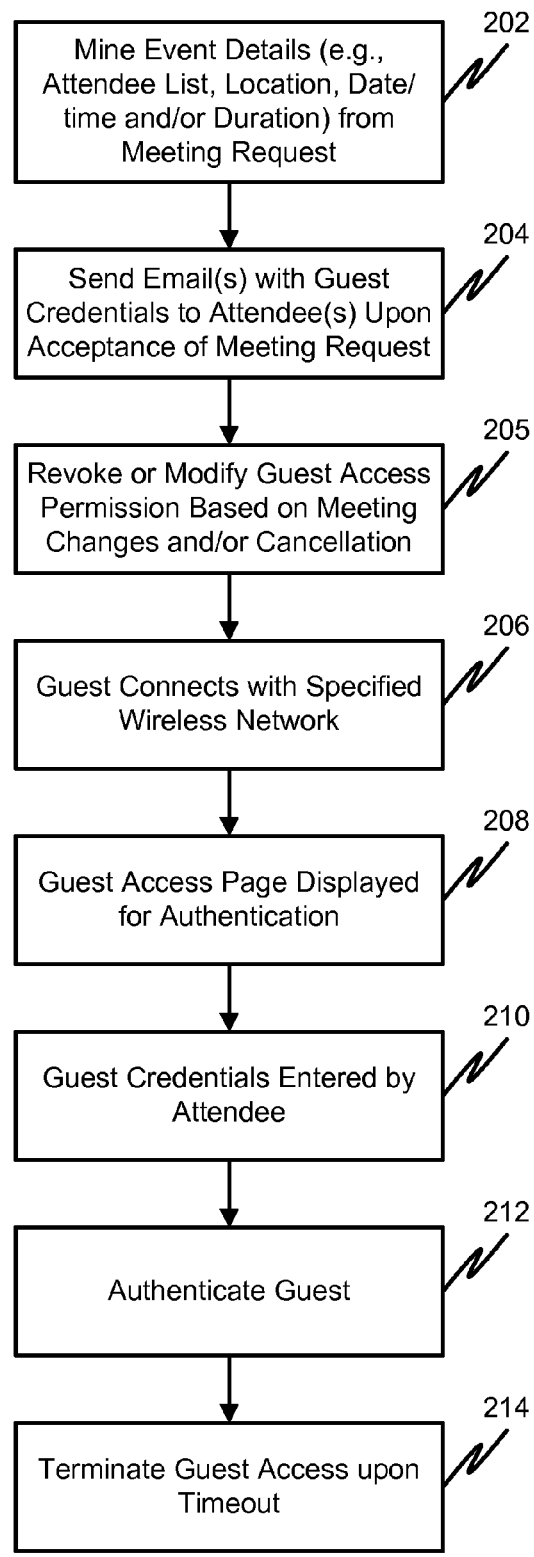
FIG. 2 is a flowchart of an example method for providing and managing wireless guest access in accordance with at least one implementation.

FIG. 2 is a flowchart of an example method for wireless guest access. Processing begins at 202, where event (or meeting) details are mined from a meeting request (or invitation) that has been received (e.g., at guest access management system 106 from a user 102 via a scheduling application 104). The event details discussed above can be mined from the request. Processing continues to 204.

At 204, an email with guest wireless access credentials is sent to each guest attendee for which wireless guest access was requested and which accepted the meeting request. The credentials can include a specified network (e.g., service set identifier, or SSID) for the guest to connect with. Processing continues to 205.

At 205, the guest access credentials can be modified or revoked based on changes to the meeting (e.g., location, duration, date/time, attendee list or the like) or a cancellation, respectively. Processing continues to 206.

At 206, one or more guests connect to the wireless network. Processing continues to 208.

At 208, a guest access page (e.g., captive portal page) is displayed for guest authentication. Processing continues to 210.

At 210, guest wireless access credentials are provided by one or more guest attendees (e.g., the credentials that were received via email are provided) via the guest access page interface. Processing continues to 212.

At 212, the guest access credentials are authenticated. If the guest has presented valid credentials, then guest access is permitted. Otherwise, guest access is denied. Processing continues to 214.

At 214, at the conclusion of the meeting duration specified in the meeting request, the wireless guest access can be terminated. It will be appreciated that a capability to extend the guest access duration can be provided to accommodate situations in which a meeting or event runs longer than expected. It will also be appreciated that 202-214 can be repeated in whole or in part in order to accomplish a contemplated wireless guest access task.

Figure 3:
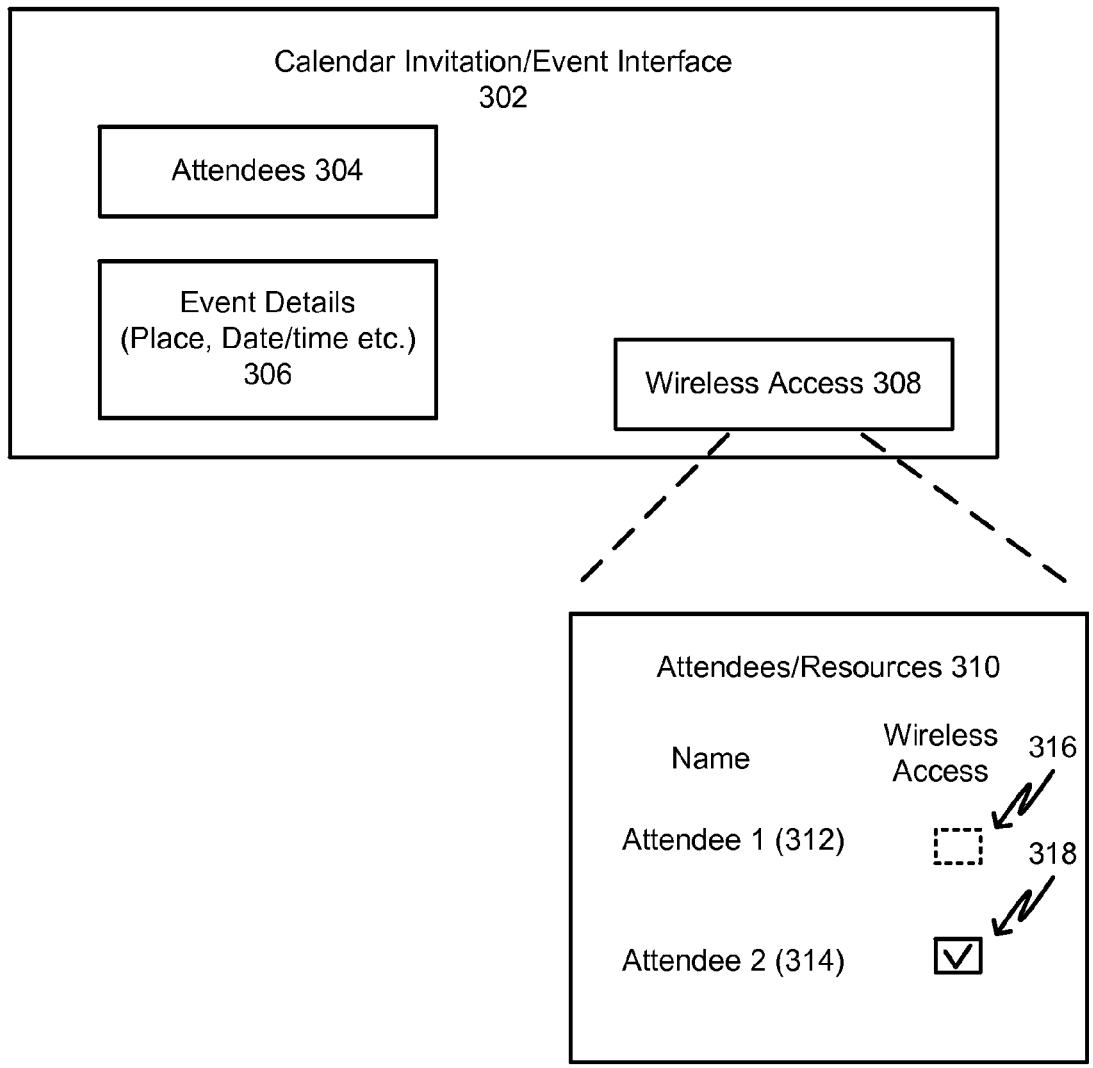
FIG. 3 is a diagram of an example user interface for providing and managing wireless guest access in accordance with at least one implementation.

FIG. 3 shows an example user interface 300 for wireless guest access. The interface 300 includes a calendar/event scheduling interface 302 having an element for receiving a list of one or more attendees 304, one or more elements for receiving event details 306, and an element for selecting wireless access options 308.

When the element (e.g., user interface button) for wireless access 308 is selected (e.g., pressed), another user interface, attendees/resources 310, can be displayed. The attendees/resources interface 310 can include a list of the attendees (312-314) and wireless options 316-318.

In this example, attendee 1 (312) is an existing user of the network and thus does not require guest wireless access. Accordingly, the wireless access element 316 for attendee 1 (312) is not selectable and can be "grayed out" as indicated by the dotted line.

Attendee 2 (314) is a guest and wireless access can be provided by selecting the wireless access element 318 for attendee 2 (314), as shown in FIG. 3 as a checked box. If the box were left unchecked, then attendee 2 would not be provided with wireless guest access credentials.

Figure 4:
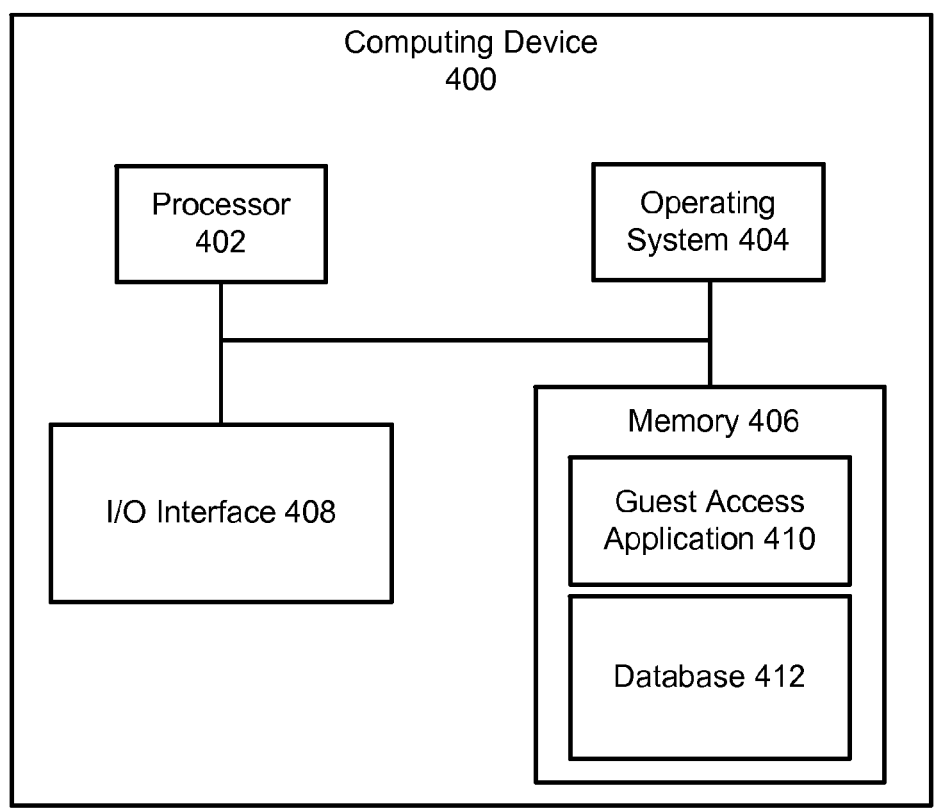
FIG. 4 is a diagram of an example computer system for providing and managing wireless guest access in accordance with at least one implementation.

FIG. 4 is a diagram of an example computer system 400 in accordance with at least one implementation. The computer 400 includes a processor 402, operating system 404, memory 406 and I/O interface 408. The memory 406 can include an application for wireless guest access 410 and a database 412 (e.g., for storing guest access credentials or the like).

In operation, the processor 402 may execute the application 410 stored in the memory 406. The application 410 can include software instructions that, when executed by the processor, cause the processor to perform operations for wireless guest access in accordance with the present disclosure (e.g., performing one or more of steps 202-214).

The application program 410 can operate in conjunction with the database 412 and the operating system 404.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for providing and managing wireless guest access.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
mining event request details including a list of one or more guest attendees for which wireless guest access is selected and a corresponding email address for each of the one or more guest attendees from an event request;
generating wireless guest access credentials for each of the one or more guest attendees that accepts the event request;
transmitting corresponding wireless guest access credentials to each guest attendee via email using the corresponding email address;
receiving an indication that one or more of the guest attendees has connected to a wireless network;
causing a guest access page to be displayed for each guest attendee connecting to the network;
providing a user interface for guest access credentials to be supplied via the guest access page;
validating the guest access credentials; and
when the guest access credentials are valid, permitting the guest attendee associated with those credentials to access the wireless network.

2. The method of claim 1, wherein the event request interface includes an element for receiving an indication of which guest attendees are to be granted guest access to the wireless network.

3. The method of claim 1, further comprising modifying or cancelling wireless guest access credentials based on changes to an event or cancellation of an event, respectively.

4. The method of claim 1, further comprising granting the wireless guest access only for a duration of the event determined from the event request.

5. The method of claim 1, further comprising granting the wireless guest access only for a location of the event determined from the event request.

6. A system comprising one or more processors configured to perform operations including:
mining event request details including a list of one or more guest attendees for which wireless guest access is selected and a corresponding email address for each of the one or more guest attendees from an event request;

generating wireless guest access credentials for each of the one or more guest attendees that accepts the event request;

transmitting corresponding wireless guest access credentials to each guest attendee via email using the corresponding email address;

receiving an indication that one or more of the guest attendees has connected to a wireless network;

causing a guest access page to be displayed for each guest attendee connecting to the network;

providing a user interface for guest access credentials to be supplied via the guest access page;

validating the guest access credentials; and when the guest access credentials are valid, permitting the guest attendee associated with those credentials to access the wireless network.

7. The system of claim 6, wherein the event request interface includes an element for receiving an indication of which guest attendees are to be granted guest access to the wireless network.

8. The system of claim 6, wherein the operations further comprise modifying or cancelling wireless guest access credentials based on changes to an event or cancellation of an event, respectively.

9. The system of claim 6, wherein the operations further comprise granting the wireless guest access only for a duration of the event determined from the event request.

10. The system of claim 6, further comprising granting the wireless guest access only for a location of the event determined from the event request.

11. A nontransitory computer readable medium having stored thereon software instructions that, when executed by a processor, cause the processor to perform operations including:

mining event request details including a list of one or more guest attendees for which wireless guest access is selected and a corresponding email address for each of the one or more guest attendees from an event request;

generating wireless guest access credentials for each of the one or more guest attendees that accepts the event request;

transmitting corresponding wireless guest access credentials to each guest attendee via email using the corresponding email address;

receiving an indication that one or more of the guest attendees has connected to a wireless network;

causing a guest access page to be displayed for each guest attendee connecting to the network;

providing a user interface for guest access credentials to be supplied via the guest access page;

validating the guest access credentials; and when the guest access credentials are valid, permitting the guest attendee associated with those credentials to access the wireless network.

12. The nontransitory computer readable medium of claim 11, wherein the event request interface includes an element for receiving an indication of which guest attendees are to be granted guest access to the wireless network.

13. The nontransitory computer readable medium of claim 11, wherein the operations further comprise modifying or cancelling wireless guest access credentials based on changes to an event or cancellation of an event, respectively.

14. The nontransitory computer readable medium of claim 11, wherein the operations further comprise granting the wireless guest access only for a duration of the event determined from the event request.

15. The nontransitory computer readable medium of claim 11, further comprising granting the wireless guest access only for a location of the event determined from the event request.

* * * * *